INVENTOR.

BY IRVING H. COHN

United States Patent Office 3,236,091
Patented Feb. 22, 1966

3,236,091
APPARATUS FOR TESTING CAPACITANCE TYPE
FLUID LEVEL SENSING EQUIPMENT
Irving H. Cohn, New York, N.Y., assignor to Simmonds
Precision Products, Inc., Tarrytown, N.Y., a corporation of New York
Filed Nov. 6, 1963, Ser. No. 321,872
9 Claims. (Cl. 73—1)

This invention relates to apparatus for testing capacitance-type liquid level sensing equipment and indicators employed therewith, and particularly but not exclusively relates to apparatus for testing capacitance-type elements utilized in the measurement of liquid oxygen.

It is an object of this invention to provide apparatus for testing systems for determining the level of a stored fluid medium.

It is a further object of this invention to provide apparatus for testing sensing elements in liquid oxygen converters and liquid oxygen indicators, which apparatus is portable and designed for "field" checking.

It is a further object of this invention to provide testing apparatus for "field" checking and measurement of the dry capacitance and insulation resistance of the sensing elements in liquid oxygen converters and for performing calibration checks on liquid oxygen indicators.

It is a further object of this invention to provide testing apparatus comprising means for measuring the capacitance of a sensing element of a liquid oxygen converter of a particular capacity and indicating any deviation of the measured value from a fixed capacitance which is equivalent to a value representing the empty or "dry" capacitance of a liquid oxygen converter of that particular capacity.

It is a further object of this invention to provide testing apparatus comprising means for evaluating the accuracy of liquid oxygen indicators installed, for example, in aircraft, variable and fixed precision-value capacitors being employed to simulate capacitances equivalent to empty and full oxygen converters of various capacities.

It is a further object of this invention to provide testing apparatus comprising means for measuring the D.C. insulation resistance between the electrodes or sensors of capacitance-type sensing elements both with respect to each other and to a common ground connection.

Testing apparatus according to this invention is particularly but not exclusively designed for use in testing capacitance-type liquid level sensing elements in tank units constructed by the present applicants.

Such tank units are of aluminum tube construction, three tubes with the middle tube cut away for profiling.

For a better understanding of this invention as well as other objects and features thereof, reference will now be made to the following description to be read in conjunction with the accompanying drawings in which.

Figures 5A, 5C:
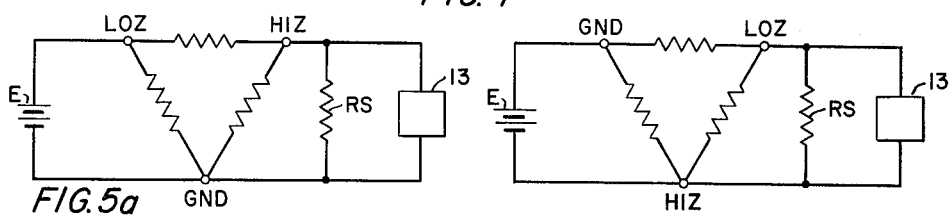
Figure 5B:
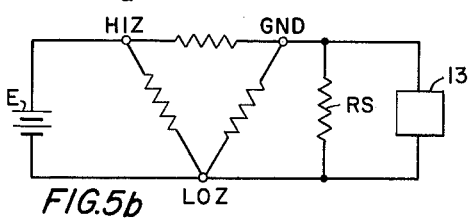

FIGURES 5a to c show a simplified form of the connections made to the latter valve voltmeter in three positions of the selector switch in the resistance measuring section of the apparatus; and FIGURE 6 illustrates a variable capacitance arrangement employed with the circuitry of this invention.

Figure 1:
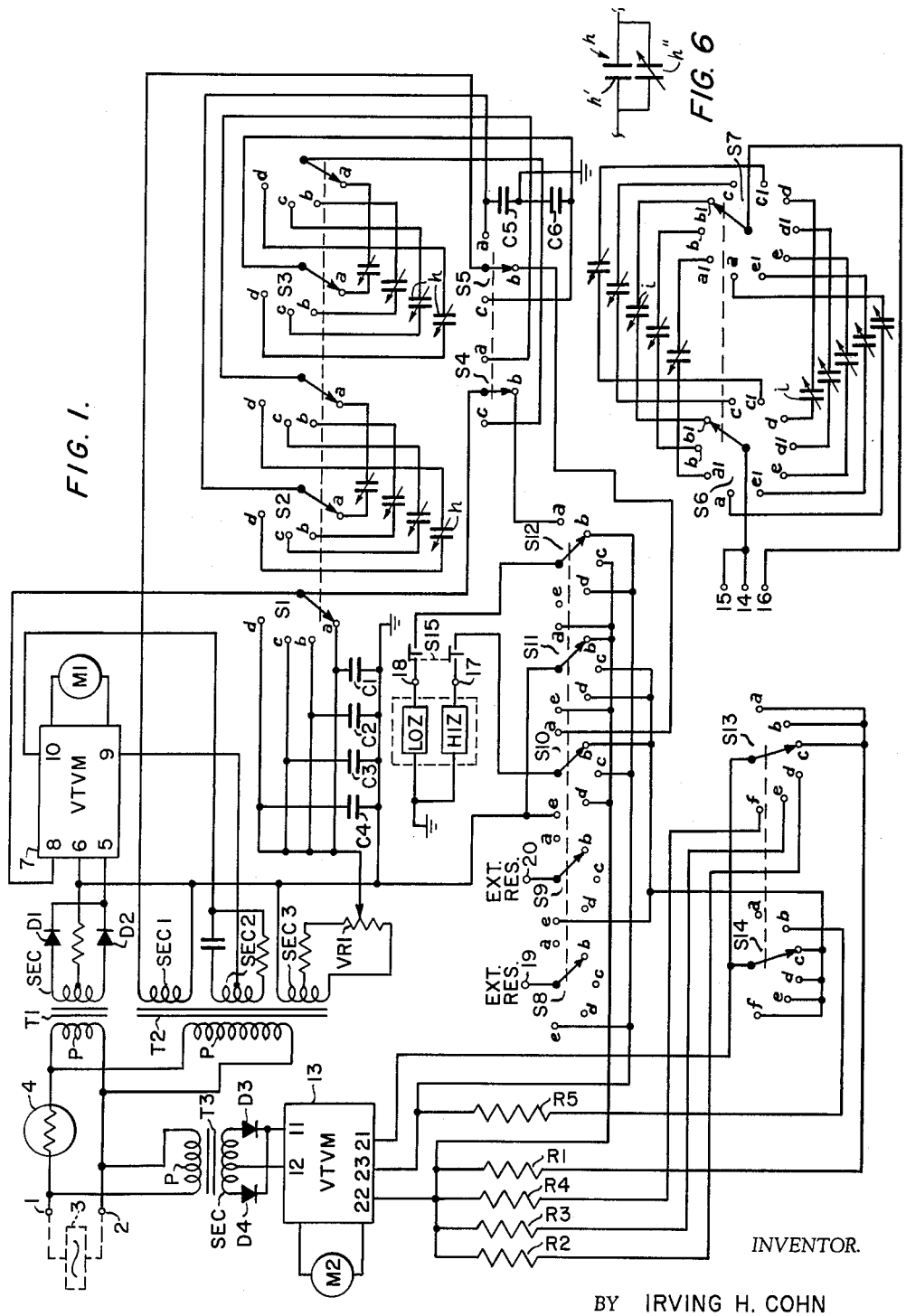
FIGURE 1 illustrates a complete block schematic diagram of apparatus according to this invention.

Referring now to FIGURE 1, apparatus according to this invention comprises two input terminals 1 and 2 to which, in use, a 115 volt 400 cycle alternating supply 3 is connected.

A ballast tube 4 is connected in series with the input terminal 1 for compensating for voltage variations in the supply and the two terminals 1 and 2 are each connected across a primary winding $T1_p$, $T2_p$ and $T3_p$ of three transformers T1, T2 and T3.

The secondary winding T1sec of transformer T1 has two unidirectional rectifying elements D1 and D2 connected to opposite ends thereof and supplies D.C. to terminals 5 and 6 in a vacuum tube valve voltmeter 7 in the capacitance measuring section of the apparatus. The transformer T2 has three secondary windings T2sec2 and T2sec3. Secondary windings T2sec1 and T2sec3 are connected across input terminals 6 (ground) and 8 of the voltmeter 7 through capacitance testing switching devices, which will be more particularly described hereinafter, and secondary winding T2sec2 is connected across terminals 9 and 10 in the output circuit of said voltmeter and supplies a reference voltage thereto.

The secondary winding T3sec of transformer T3 is connected to two rectifying elements D3 and D4 and supplies D.C. to terminals 11 and 12 in a vacuum tube valve voltmeter 13 in the resistance measuring section of the apparatus.

The voltmeter 7 is connected to a meter M1 calibrated for capacitance measurement, and the voltmeter 13 is connected to a meter M2 which is calibrated to read a resistance value (megohms).

The voltmeter 7 comprises a capacitance measuring phase-sensitive bridge circuit. The input terminal 8 is connected both to the movable slider of a switch S1, which is ganged to switches S2 and S3, and the movable slider of a switch S4, which in turn is ganged to a switch S5. The movablye slider of switch S5 is connected to grounded input terminal 6 through the secondary winding T2sec1 of transformer T2. The movable slider of switch S4 is connected both to the input terminal 8 of the voltmeter 7 and the movable slider of switch S1 which in turn is coupled through a selected one of four switching contacts S1a, S1b, S1c, S1d through a common variable resistor or potentiometer VR1 and secondary winding T2sec3 to the grounded terminal 6. Four capacitors C1, C2, C3 and C4 are respectively connected between ground and the switch contacts S1a, S1b, S1c and S1d, and thus, in dependence on the position of the ganged switches S1–S3, the input terminals 6 and 8 of the voltmeter 7 are shunted by one of these capacitors C1–C4. This capacitative has the effect of isolating the reading of meter M1 from variations in power supply frequency, the capacitance being increased on the less sensitive ranges so as to decrease susceptibility to shunt capacity when testing the tank units.

The ganged switches S2 and S3 each comprise pairs of switching sliders between corresponding contacts (a, b, c, d) of which are connected variable capacitors. The values of the capacitors connected between these contacts a, b, c and d may conveniently correspond to the capacitance values of empty tank units on liquid oxygen converters of 5, 10, 25 and 75 liters capacity, respectively, these capacitors effectively simulating the empty capacitance of these converters.

The variable capacitors h connected across the associated contacts a–d in the switch S2 are adjustable for the zero-balance setting of the meter M1 of the voltmeter 7 and the variable capacitors connected across the associated contacts a–d of the switch S3 are adjustable for calibrating the full-scale deflection of this meter.

The ganged switches S4 and S5 each have three contacts $a$, $b$ and $c$ which are utilized for zero-balance, read and calibration procedures as will be described below.

Two capacitors C5 and C6 are connected respectively to contacts $a$ and $c$ of switch S5 and ground, and effectively shunt the input to valve voltmeter 7 during the zero-balance and calibration procedures.

Figure 2:
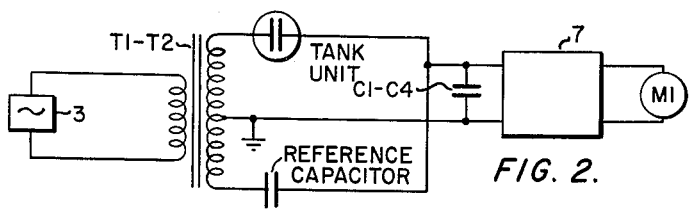
FIGURE 2 illustrates the basic circuit employed in the capacitance testing section of the apparatus according to this invention.

It is convenient at this stage to refer to FIGURE 2 in the drawings which illustrates the principal components of the circuit just described, without showing the complex multi-range switching arrangements. It is clear from this drawing that in operation, the actual capacity of a selected tank unit is compared with the reference capacitor representative of the calcuated true value of the capacitance of this selected tank unit in an open loop bridge circuit, any difference voltage being fed across the shunt capacitors C1 to C4 to the voltmeter 7 and causing a deflection of meter M1.

Referring now again to FIGURE 1, the indicator test section comprises a pair of ganged switches S6 and S7, each having a slider and ten contacts $a$, $a'$—$b$, $b'$—$c$, $c'$—$d$, $d'$ and $e$, $e'$. Corresponding contacts $a$, $a$—$b$, $b$—$c$, $c$ . . . of the two switches are coupled together through variable capacitors. The capacitors connected across the contacts $a$—$a$, $b$—$b$, $c$—$c$, $d$—$d$ and $e$—$e$ are representative of the empty capacitance values of 5, 10, 20, 25 and 75 liter tank units, respectively, and the capacitors connected across the contacts $a'$—$a'$, $b'$—$b'$, $c'$—$c'$, $d'$—$d'$ and $e'$—$e'$ are representative of the full capacitance values of the 5–75 liter tank units, respectively. These capacitance values are used to drive the indicator under test to its empty and full positions. The wiper of the switch S6 is connected to an output terminal 14 adapted to be connected to a liquid oxygen indicator. This wiper is in addition connected to a terminal 15 and the wiper of the switch S7 is connected to a terminal 16, the terminals 15 and 16 being adapted to be connected across a precision capacitor box enabling adjustment of the capacitors above referred to in a manner which will be described below.

The insulation resistance testing section of the apparatus comprises five ganged switches S8, S9, S10, S11 and S12, each of which has five contacts $a$, $b$, $c$, $d$ and $e$. Position $a$ is used for calibrating, position $b$ for Hi.Z–Lo.Z insulation resistance, positions $c$ and $d$ for Hi.Z and Lo.Z-ground insulation resistance, respectively, and position $e$ for resistance checking. The wipers of the switches S10 and S12 are connected respectively to terminals 17 and 18 which are adapted to be connected to the Hi.Z and Lo.Z electrodes of a tank unit under test. The wiper of the switch S11 is grounded, and the wipers of the switches S8 and S9 are connected to terminals 19 and 20 which are adapted to be connected to an external resistance for checking the calibration of the voltmeter 13.

Contact $a$ of switch S12 is connected to contact $b$ of switch S4 and contact $a$ of switch S10 is connected to the contact $b$ of switch S5. The remaining contacts $b$, $c$ and $d$ on the switches S10 and S12, contacts $b$, $c$, $d$ and $e$ of switch S11 and contacts $e$ of switch S11 and contacts $e$ of switches S8 and S9 are coupled to the voltmeter 13 in a manner described below.

The voltmeter 13 has two input terminals 21 and 22, and a regulated output test-voltage terminal 23. Two ganged switches S13 and S14 are connected to the input terminals 21 and 22 and the output terminal 23 for effecting range change and calibration functions on the meter M2 in the voltmeter 13. Each of these latter switches has six contacts $a$, $b$, $c$, $d$, $e$ and $f$.

Contacts $a$, $b$ and $c$ of switch S13 are connected in common to a register R1 which in turn is connected to the input terminal 22 of the voltmeter 13 and contacts $c$ of S12, contacts $a$, $b$ and $e$ of S11 and contact $d$ of S10. Contacts $d$, $e$ and $f$ of switch S13 are respectively connected to the said terminal 22, and thus the aforesaid contacts, through resistors R2, R3 and R4. Resistor R2 has a value 10 times that of the resistor R1, resistor R3 has a value 10 times that of R2, and resistor R4 has a value 10 times that of R3. The switching-in of these resistors R1–R4 by the switch S13 effects a range change in the output indication of the meter M2 in the voltmeter 13 as will be more particularly described below.

Contact $b$ of switch S14 is connected through a resistor R5, having the same value as resistor R4, to terminal 23 of the voltmeter 13 which in turn is connected to contact $e$ of switch S8, contact $c$ of S10 and contacts $b$ and $d$ of S12. Contacts $c$, $d$, $e$ and $f$ of switch S14 are connected in common to contact $e$ of switch S9, contact $b$ of S10 and contacts $c$ and $d$ of S11.

The wiper contacts of these switches S13 and S14 are connected together in common to the input terminal 21 of the voltmeter 13.

Contacts $a$ and $b$ of switches S13 and S14 are utilized for calibrating the voltmeter 13 and the remaining contacts $c$ to $f$ are utilized for effecting range changes in the output indication of this voltmeter. The operation of switches S8 to S12 together with S13 and S14 will be more particularly described below.

Figure 3:
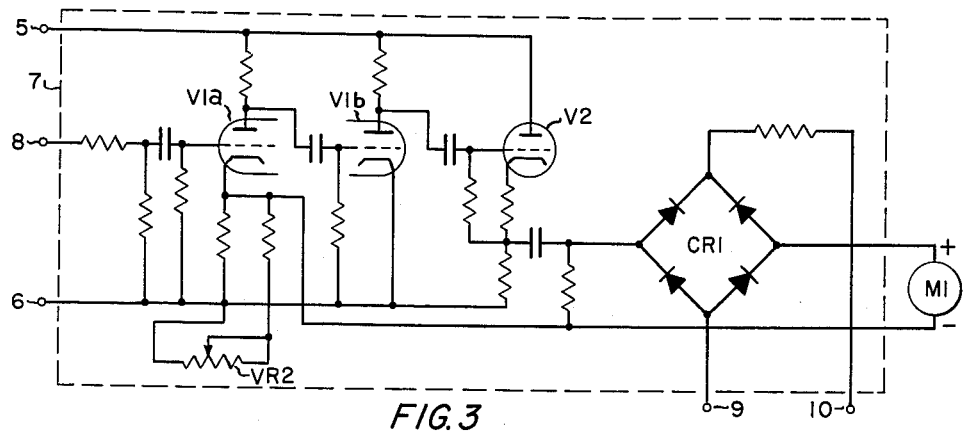
FIGURE 3 illustrates in more detail the vacuum tube valve voltmeter employed for capacitance measurement, as shown in FIGURE 1.

In order to describe the operation and meter calibrating procedures in the capacitance measuring section of the apparatus, reference will initially be made to FIGURE 3 in the drawings which illustrates the valve voltmeter 7 in more detail.

This valve voltmeter is of conventional construction and comprises a cascade-connected double-triode tube V1$a$, V1$b$, the output of which is connected to the input of a cathode follower tube V2. One terminal of phase sensitive detector CR1 is connected to the output of this cathode follower and the opposite terminal of this bridge is connected to one side of a meter M1, the other side of this meter being connected to the cathode electrode of the first half V1$a$ of the double triode. The other two opposite terminals of the bridge rectifier CR1 are connected through terminals 9 and 10 to the secondary winding T2sec2 of transformer T2 as described.

A calibration potentiometer VR2 is connected in the cathode circuit of the aforesaid first half V1$a$ of the double triode. As is evident from this figure the valve voltmeter 7 comprises many other conventional coupling and bias resistors and capacitors but since their function is well known and is not particularly relevant to an understanding of this invention they will not be described or referred to in detail.

For completeness, the initial setting-up procedure for the variable capacitors $h$ connected to the switches S2 and S3 in the capacitance measuring section and the variable capacitors $i$ connected to the switches S6 and S7 in the indicator test section of the apparatus will now be described.

The variable capacitors referred to above are actually constituted by a fixed "large value" capacitor $h'$ and a small value trimmer capacitor $h''$ connected in parallel therewith, as shown in FIGURE 6. Such an arrangement obviously provides a greater degree of sensitivity of adjustment than would otherwise be the case if one large value capacitor were provided which was itself variable.

In adjusting the capacitance measuring section the ganged switches S8 to S12 are initially switched to the position in which the wipers align with contacts $a$, and ganged switches S1 to S3 are also switched to position $a$. This setting of switches S1 to S3 corresponds to a 5 liter capacity tank unit. A precision test capacitor corresponding to the "empty" value of a 5 liter tank, e.g. 63.5 picofarads, is then connected across terminals 17 and 18 to simulate the tank unit. Ganged switches S4 and S5 are switched to their position $b$ (read) as shown, whereby the test capacitor is thus effectively connected across the input terminals 6 and 8 of the valve voltmeter 7. The reading of the meter M1 is observed and potentiometer VR1 is adjusted to give a zero reading on this meter.

Swithces S4 and S5 are then switched to their position a (zero-balance) so that the variable capacitor connected across the two contacts a of switch S2 is now connected across the valve voltmeter input terminals instead of the test capacitor. The trimmer of this variable capacitor is then adjusted to give a zero reading on the meter M1.

The above procedure is repeated until there is no change in the zero reading of the meter when the switches S4 and S5 are switched between positions a and b.

The test capacitor is then replaced by a variable precision test capacitor box. This test capacitor box is initially adjusted so as to give a zero reading on the meter with the switches S4 and S5 in the position b. Subsequently, the capacitor box is adjusted to give a value of say 0.5 picofarad higher than the zero-adjusted reading and this should produce a full-scale deflection on the meter M1 so that the pointer thereof is aligned with a predetermined calibrated position. Any discrepancy between the required and the actual reading is corrected by adjustment of the calibration potentiometer VR2 (FIGURE 3). Ganged switches S4, S5, are then switched to position c (calibrate) and the trimmer of the capacitor connected across the contacts a of switch S3 adjusted so that the meter M1 maintains its reading at the aforesaid calibrated position. The above procedure is repeated until there is no change in the zero reading of the meter when the switches S4 and S5 are switched between the positions b and c.

A similar procedure is carried out for the remaining zero-balance and calibrate positions of the meter M1 for the 10, 25 and 75 liter tank units, the ganged switches S2, S3 being stepped round in turn to their positions b, c and d.

Capacitors C5 and C6 referred to above provide a shunt capacity to the zero-balance and calibrate variable capacitors to provide maximum rejection of the quadrature signal at the input to the valve voltmeter 7.

The calibration of the variable capacitors i associated with the switches S6 and S7 in the indicator test section is effected in a manner similar to that described above.

In particular, terminals 15 and 16 are connected externally to a precision test capacitor box and a standard bridge circuit whereby the variable capacitors or more correctly, the trimmers, may in turn be adjusted to the values accurately corresponding to those of the empty and full values of the tank units, the capacitors coupled between the contacts S6a′–S7d′, S6b′–S7b′ . . . corresponding to the full values of these tank units as described above and the capacitors connected across the terminals S6a–S7a, S6b′–S7b . . . corresponding to the empty values of these tank units.

Figure 4:
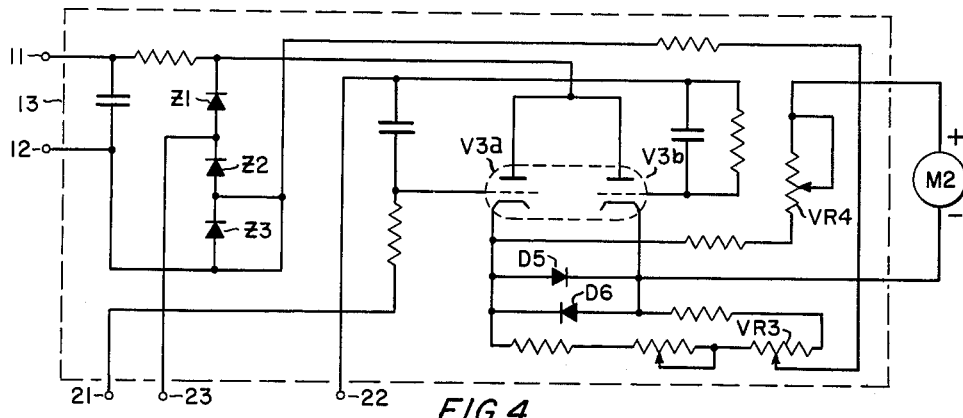
FIGURE 4 illustrates in more detail the vacuum tube valve voltmeter employed for measuring resistance as shown in FIGURE 2.

Referring now to the resistance testing section of the apparatus a detailed circuit diagram of the valve voltmeter 13 is illustrated in FIGURE 4.

The supply voltage at terminal 11 of this voltmeter is accurately regulated by a string of three Zener diodes Z1, Z2 and Z3 connected in series across terminals 11 and 12. Terminal 23 is connected to the junction between Zener diodes Z1 and Z2 and input terminal 22 is connected to the junction between the other two Zener diodes Z2 and Z3. Input terminal 21 is connected to the grid electrode of one-half of a double triode tube V3a, V3b and input terminal 22 is connected to the grid of the other half of this tube. The cathodes of the valve V3a, V3b are strapped together by two limiting diodes D5 and D6 for meter protection arranged back-to-back, and a potentiometer VR3 is connected across these rectifying elements in the cathode circuit of this tube for adjusting the full-scale (∞) deflection of the meter M2.

The meter M2 is also effectively connected across these limiting diodes D5 and D6 in series with a resistance chain comprising a potentiometer VR4 which is variable to effect a "mid-scale" adjustment of the meter M2.

As mentioned above in connection with the voltmeter 7 this voltmeter 13 also includes a plurality of coupling and bias capacitors and resistors which are shown in the drawing merely for completeness but will not be described in particular herein.

For calibration purposes, the wiper blades of the ganged switches S13 and S14 are switched to align with their contacts a and the wiper blades of switches S8 to S12 are switched to align with their contacts b (Hi.Z–Lo.Z). The reading on the meter M2 is observed and adjusted to align with the infinity (∞) position by the potentiometer VR3. The ganged switches S13 and S14 are then switched to position b and the potentiometer VR4 adjusted so that the meter pointer aligns with a mid-scale position.

The above procedure is repeated in order to cancel out any changes in the setting of the full-scale deflection by adjustment of the mid-scale deflection, and vice versa.

A typical checking procedure carried out by the apparatus acording to this invention will now be described.

For testing the capacitance of a tank unit, e.g. 5 liter capacity, this tank unit is connected to the terminals 17 and 18, the Hi.Z electrode being connected to the terminal 17 and the Lo.Z electrode being connected to the terminal 18. The ganged switches S8 to S12 and ganged switches S1 to S3 are then switched to position a, and the ganged switches S4, S5 are also switched to position a. After an appropriate warming up period the "zero balance" potentiometer VR1 is adjusted for a zero reading on the meter M1 to correct for any changes in circuit constants and the supply. Switches S4, S5 are then switched to position c and the calibration potentiometer VR2 is adjusted so that the meter M1 aligns with the "calibration" point.

Ganged switches S4, S5 are then switched to position b, that is, the "read" position and the meter M1 should read between a positive (high) and a negative (low) point to indicate the acceptable capacitance range. Switches S4, S5 are then returned to position a.

Operation of the indicator test section is effected merely by connecting terminal 11 to the indicator to be tested and connecting a supply voltage thereto. The wipers of ganged switches S6 and S7 are moved to align with contacts a′, a′ corresponding to the full value of the tank unit i.e., 5 liter to which the indicator is adapted to respond and the reading of this indicator noted, which should, of course, read full scale. The ganged switches S6, S7 are then switched to the position a, a indicative of the empty reading of this unit and the reading again observed, which should in this case indicate zero.

The insulation resistance between the electrodes of the capacitance type sensing element is measured by the connecting terminals 17 and 18 to the Hi.Z and Lo.Z electrodes of this element as mentioned above.

The insulation resistance between the Hi.Z and Lo.Z electrodes is measured by twitching the ganged switches S8 to S12 to align with contacts a. Ganged switches S13, S14 are switched to position c, that is the unity multiplication (×1) range. The reading observed on the meter M2 is the insulation resistance from the Hi.Z to Lo.Z electrodes of the element. This reading can be more accurately determined by switching the range switch S13, S14 to any one of the four multiplication ranges ×1, ×10, ×100, ×1000.

The Hi.Z to ground resistance is measured by observing the meter when the ganged switches S8 to S12 are switched to position c and the resistance between Lo.Z and ground is measured by observing the meter after switching the ganged switches S8 to S12 to position d, in a similar manner to that described with respect to the Hi.Z–Lo.Z procedure. Since some degree of grid current leakage may be evident in the voltmeter 13 which would tend to affect the calibration of the meter M2, a push button switch S15 may be connected in the leads to terminals 17 and 18. When this switch is depressed the tank unit being checked is isolated and, when range switch S13, S14 is in any one of its four multiplication range positions the meter M2 should thus read infinity. Any re-adjustment required is thus effected whilst switch S15 is depressed, the meter exhibiting the appropriate insulation resistance Hi.Z–Lo.Z-ground upon release of this switch.

FIGURES 5a to c show the effective connections which are made by switching the ganged switches S8 to S12 to the positions b, c and d, respectively. As is apparent from this figure, the principle of measurement is one in which the resistance of one arm of a delta network may be accurately measured in the presence of a moderately low shunt resistance made up of the other two arms.

FIGURE 5a shows the basic test of insulation resistance from Lo.Z to Hi.Z, measuring current flowing from the supply source, indicated in this figure as a battery E, through the Lo.Z to Hi.Z resistance, through a calibrated resistance RX, comprising switching resistors R1 to R4 (see FIGURE 1) and back to the source. Since the source is of low impedance, the shunt path through Lo.Z to ground is unimportant and since RS is of comparatively low value of resistance Hi.Z to ground is again unimportant.

FIGURES 5b and 5c show how the delta network is effectively rotated by switching the ganged switches S8 to S12 to positions c and d to measure Lo.Z to ground and Hi.Z to ground. This three wire circuit possesses a considerable advantage over conventional two wire testing circuits in that a tank unit may be considered "good" if the Hi.Z to Lo.Z resistance is high even if the Hi.Z to ground resistance and the Lo.Z to ground resistances are low. A two wire insulation tester will reject an otherwise good tank unit in measuring Hi.Z to Lo.Z if there is enough shunt leakage through these paths.

Another advantage of apparatus in accordance with this invention is that the capacitance section is not disabled when the insulation resistance of the tank unit is being measured and conversely the resistance section is not disabled when the capacitance is being measured. The difference in lead lengths between the calibrate, balance and read circuits with the resultant slight errors in the capacity readings is therefore minimized. Moreover, such errors as there are may be completely eliminated by realignment of the precision test capacitors which are used to calibrate and balance the valve voltmeter 7, thus, for example, to produce a true reading of say a 63.5 picofarads a test capacitor of 63.55 picofarads will be required to be used.

Although there has been shown what is considered to be a preferred embodiment of the invention, it will be evident that many changes and modifications can be made without departing from the essential spirit of the invention.

For example, provision may be made in the indicator test section for a low-level light on the apparatus which is illuminated to simulate a condition indicative of the quantity of liquid oxygen lying below say, 10% of the maximum capacity. This light may conveniently be operated by depressing a test switch when the switches S6, S7 are set to a position corresponding to a full value of a tank unit, this switch by-passing the supply to the indicator and causing the pointer thereon to travel downscale at least to the zero or empty position.

It is intended therefore, in the annexed claims, to cover all such changes and modifications as fall within the scope of the invention.

I claim:

1. Apparatus for testing systems operable to determine the level of a stored fluid medium and which employ capacitance-type fluid-level sensing elements having two concentric tubes, one tube having a high impedance and the other tube having a low impedance to a ground connection, comprising a sensing element capacitance testing section,
a sensing element impedance testing section, and
a fluid-level indicator testing section, said capacitance testing section comprising
supply terminals for receiving an electrical supply potential,
a phase-sensitive two arm bridge circuit having input terminals connected to said supply terminals, and output terminals,
first switching means connected to said one arm of the bridge circuit,
a plurality of first capacitors having different predetermined values connected to said first switching means and arranged to be selectively connected in one arm by said first switching means, the other arm of said bridge circuit being adapted to have a said sensing element connected therein and said capacitor selected being dependent on the value of said sensing element connected in said other arm,
a first vacuum tube valve voltmeter connected to said output terminals and having a calibrated range the limits of which correspond to predetermined acceptable limits of capacitance for a said sensing element, said limits corresponding to minor deviations in one sense and the opposite sense from the balanced position of said bridge circuit, said impedance testing section comprising
a second vacuum tube valve voltmeter connected to said supply terminals and having input terminals and a range calibrated in resistance,
voltage stabiliser circuit means connected to said supply terminals for developing a sabilised reference voltage and
second switching means for connecting said high impedance tube and said low impedance tube of said sensing element and said ground connection in a three arm delta network comprising the low impedance ground connections, the high impedance-ground connections and the low impedance-high impedance connections of said sensing element, and selectively connecting one arm of the delta connection between said voltage stabilizer circuit means and said second vacuum tube valve voltmeter and the other two arms of the delta connection across said input terminals of the second vacuum tube voltmeter, said indicator testing section comprising
a plurality of second capacitors having different values each corresponding to that possessed by a said sensing element to which a said fluid level indicator is adapted to respond when said sensing element records zero or minimum fluid level.
a plurality of third capacitors having different values each corresponding to that possessed by said sensing element when said sensing element records maximum fluid level and
third switching means for connection to said fluid-level indicator and switchable selectively to connect a said second and a said third capacitor to said fluid-level indicator for testing the calibration thereof.

2. Apparatus for checking the impedance values of a fluid-level sensing element in a storage tank, said sensing element having two concentric tubes one having a high and the other having a low impedance to a common ground connection, comprising
a first ganged multi-position switching element comprising first, second and third switches, each having a movable arm, and first, second, third, and fourth fixed contacts selectively engageable thereby, said movable arms of the first and third switches being connected respectively to the low impedance and high impedance concentric tubes of said sensing element, and the movable arm of the second switch being connected to ground,
a source of electrical supply,
a vacuum tube valve voltmeter connected to said source and having first and second input terminals, an output terminal and an output meter calibrated to read resistance, said first input terminal being connected in common to said second fixed contact of the first switch, said first and fourth contacts of said second switch and said third contact in said third switch, and said output terminal being connected in common to said first and third contacts of said first switch and said second contact of said third switch, and a second ganged multi-position switching element comprising first and second switches each having a movable arm connected to said second input terminal of the vacuum tube valve voltmeter and first, second, third, fourth, fifth and sixth fixed contacts selectively engageable thereby, the first, second and third contacts of the first switch of the second switching element being connected through a common first resistor to said first input terminal of the vacuum tube valve voltmeter, the fourth, fifth and sixth contacts of the first switch of said second switching element being connected respectively through second, third and fourth range-changing resistors to said first input terminal of the vacuum tube valve voltmeter, the second contact of the second switch being connected through a fifth resistor to said output terminal and the third, fourth, fifth and sixth contacts of the second switch of the fourth switching element being connected in common to the first contact of the third switch of the first switching element and the second and third contacts of the second switch of said first switching element.

3. Apparatus according to claim 1, comprising fourth and fifth switches ganged to said first, second and third switches in said first switching element, said fourth and fifth switches each having a movable arm and first, second, third and fourth fixed contacts selectively engageable thereby, said movable arms of the fourth and fifth switches being connected respectively to two terminals for connection to a calibration resistor for said vacuum tube valve voltmeter, said fourth contact of the fourth switch being connected to said output terminal of the valve voltmeter and said fourth contact of the fifth switch being connected in common to said third, fourth, fifth contacts of the second switch of the second switching element.

4. Apparatus for checking the capacitance value of a fluid-level sensing element in an empty storage tank, said sensing element having two concentric tubes one having a high and the other having a low impedance value to a common ground connection, comprising
   a source of electrical supply,
   a vacuum tube valve voltmeter connected to said source and having a first input terminal connected to ground and a second input terminal, and an output meter having a calibrated range the limits of which correspond to predetermined acceptable limits of capacitance for a said sensing element when said storage tank is empty,
   a first ganged multi-position switching element comprising a first switch, and second and third pairs of switches, said first switch having a movable arm connected to said second input terminal, and first, second, third and fourth fixed contacts selectively engageable by said arm, said second and third pairs of switches each having two ganged movable arms and first, second, third and fourth fixed contacts selectively engagable by a corresponding one of said arms,
   first, second, third and fourth fixed capacitors respectively connected between said fixed first, second, third and fourth contacts and a common ground connection,
   first, second, third and fourth variable capacitors respectively connected between said fixed contacts in said second pair of switches, and having predetermined values corresponding to the minimum acceptable capacitance values of said sensing element in empty tanks of specified volumetric capacities,
   fifth, sixth, seventh and eighth variable capacitors respectively connected between said first, second, third and fourth fixed contacts in said third pair of switches and having predetermined values corresponding to the maximum acceptable capacitance values of said sensing element in empty tanks of said volumetric capacities,
   a second ganged multi-position switching element comprising first and second switches each having a movable arm, and first, second and third fixed contacts selectively engageable thereby, said movable arm of the first switch of the second switching element being connected to said second input terminal, the movable arm of the second switch of the second switching element being connected to said first input terminal, the first fixed contacts in the first and second switches in the second switching element being connected respectively to the movable arms in said second pair of switches, and said second fixed contacts in the first and second switches in the second switching element being connected respectively to the movable arms in said third pair of switches,
   a third ganged multi-position switching element comprising first and second switches, each having a movable arm, and a fixed contact selectively engageable and disengageable thereby, said movable arms of the first and second switches in the third switching element being connected respectively to the low impedance and high impedance concentric tubes of said sensing element, and the fixed contacts of the first and second switches of the third switching element being connected respectively to the third contacts of the first and second switches of the second switching element.

5. Apparatus according to claim 4, wherein each of said variable capacitors comprises a fixed large value capacitor and a variable small value capacitor in parallel therewith.

6. Apparatus for checking the operational parameters of a fluid-level sensing element in a storage tank and an indicator therefor, said sensing element having two concentric tubes, one having a high and the other having a low impedance value, to a common ground connection, comprising
   a source of electrical supply,
   a first vacuum tube valve voltmeter connected to said source and having a first input terminal connected to ground and a second input terminal, and an output meter having a calibrated range the limits of which correspond to predetermined acceptable limits of capacitance for a said sensing element when said storage tank is empty,
   a first ganged multi-position switching element comprising a first switch, and second and third pairs of switches, said first switch having a movable arm connected to said second input terminal, and first, second, third and fourth fixed contacts selectively engageable by said arm, said second and third pairs of switches each having two ganged movable arms and first, second, third and fourth fixed contacts selectively engageable by a corresponding one of said arms,
   first, second, third and fourth fixed capacitors respectively connected between said first, second, third and fourth fixed contacts of the first switch and a common ground connection,
   first, second, third and fourth variable capacitors respectively connected between said first, second, third and fourth fixed contacts in said second pair of switches, and having predetermined values corresponding to the minimum acceptable capacitance values of said sensing element in empty tanks of specified volumetric capacities, fifth, sixth, seventh and eighth variable capacitors respectively connected between said first, second, third and fourth fixed contacts in said third pair of switches and having predetermined values corresponding to the maximum acceptable capacitance values of said sensing element in empty tanks of said volumetric capacities, a second ganged multi-position switching element comprising first and second switches each having a movable arm, and first, second and third fixed contacts selectively engageable thereby said movable arm of the first switch of the second switching element being connected to said second input terminal, the movable arm of the second switch of the second switching element being connected to said first input terminal, the first fixed contacts in the first and second switches in the second switching element being connected respectively to the movable arms in said second pair of switches, and said second fixed contacts in the first and second switches in the second switching element being connected respectively to the movable arms in said third pair of switches, a third ganged multi-position switching element comprising first, second and third switches, each having a movable arm, and first, second, third, fourth and fifth fixed contacts selectively engageable thereby, said movable arms of the first and third switches in the third switching element being connected respectively to the low impedance and high impedance concentric tubes of said sensing element, the movable arm of the second switch in the third switching element being connected to ground and the first contacts of the first and third switches of the third switching element being connected respectively to the third contacts of the first and second switches of the second switching element, a second vacuum tube valve voltmeter connected to said source and having first and second input terminals, an output terminal and an output meter calibrated to read resistance, said first input terminal being connected in common to said third fixed contact of the first switch, said first, second and fifth contacts of said second switch and said fourth contact in said third switch of the third switching element, and said output terminal being connected in common to said second and fourth contacts of said first switch and said third contact of said third switch in the third switching element, a fourth ganged multi-position switching element comprising first and second switches each having a movable arm connected to said second input terminal of the second vacuum tube valve voltmeter and first, second, third, fourth, fifth and sixth fixed contacts selectively engageable thereby, the first, second and third contacts of the first switch of the fourth switching element being connected through a common first resistor to said first input terminal of the second vacuum tube valve voltmeter, the fourth, fifth and sixth contacts of the first switch of said fourth switching element being connected respectively through second, third and fourth range-changing resistors to said first input terminal of the second vacuum tube valve voltmeter, the second contact of the second switch being connected through a fifth resistor to said output terminal and the third, fourth, fifth and sixth contacts of the second switch of the fourth switching element being connected in common to the second contact of the third switch of the third switching element and the third and fourth contacts of the second switch of said third switching element, first and second output terminals for connection to said fluid-level indicator, a fifth ganged multi-position switching element comprising first and second switches each having, a movable arm, and first, second, third, fourth and fifth pairs of fixed contacts selectively engageable thereby, said movable arms of the first and second switches of the fifth switching element being connected respectively to said first and second output terminals, a variable capacitor connected between a corresponding one of the pair of contacts in each of said first, second, third, fourth and fifth pairs of contacts in the first and second switches in the fifth switching element, and a variable capacitor connected between the corresponding other contacts in each of said first, second, third, fourth and fifth pairs of contacts in said first and second switches in the fifth switching element, the variable capacitors connected between said corresponding one contacts having values corresponding to the capacitance of a sensing element in empty storage tanks of specified volumetric capacities and the variable capacitors connected between said corresponding other contacts having values corresponding to the capacitance of a sensing element in full storage tanks of said specified volumetric capacities.

7. Apparatus according to claim 6, wherein each of said variable capacitors comprises a fixed large value capacitor and a variable small value capacitor in parallel therewith.

8. Apparatus according to claim 6, comprising
fourth and fifth switches ganged to said first, second and third switches in said third switching element, said fourth and fifth switches each having a
movable arm and
first, second, third, fourth and fifth fixed contacts selectively engageable thereby, said movable arms of the fourth and fifth switches being connected respectively to two terminals for connection to a calibration resistor for said second vacuum tube valve voltmeter, said fifth contact of the fourth switch being connected to said output terminal of the second valve voltmeter and said fifth contact of the fifth switch being connected in common to said third, fourth, fifth and sixth contacts of the second switch of the fourth switching element.

9. Apparatus according to claim 6, wherein said sensing element is operable to measure the level of liquid oxygen in said storage tank.

References Cited by the Examiner
UNITED STATES PATENTS

| | | | |
|---|---|---|---|
| 2,458,187 | 1/1949 | Moncalm | 317—249 |
| 2,866,948 | 12/1958 | Witt | 324—62 |
| 3,176,221 | 3/1965 | Stamler | 73—304 X |

LOUIS R. PRINCE *Primary Examiner.*

S. C. SWISHER, *Assistant Examiner.*